US012652398B2

(12) United States Patent
Wang et al.

(10) Patent No.: US 12,652,398 B2
(45) Date of Patent: Jun. 9, 2026

(54) DECODING PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Zhenxiang Wang, Shenzhen (CN); Hongbin Cao, Shenzhen (CN); Sijia Chen, Shenzhen (CN); Jia Zhang, Shenzhen (CN); Yongcheng Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 225 days.

(21) Appl. No.: 18/243,621

(22) Filed: Sep. 7, 2023

(65) Prior Publication Data

US 2023/0421779 A1 Dec. 28, 2023

Related U.S. Application Data

(63) Continuation of application No. PCT/CN2022/109578, filed on Aug. 2, 2022.

(30) Foreign Application Priority Data

Aug. 20, 2021 (CN) .......................... 202110965320.0

(51) Int. Cl.
H04N 19/172 (2014.01)
H04N 19/436 (2014.01)
(52) U.S. Cl.
CPC ......... *H04N 19/172* (2014.11); *H04N 19/436* (2014.11)
(58) Field of Classification Search
CPC ............................ H04N 19/00; H04N 19/436
See application file for complete search history.

(56) References Cited

U.S. PATENT DOCUMENTS

2012/0008681 A1* 1/2012 Lundin ................ H04N 19/895
375/E7.243

FOREIGN PATENT DOCUMENTS

CN 107613302 A 1/2018
CN 110446046 A 11/2019

OTHER PUBLICATIONS

Machine translation of CN 110446046 A. Obtained at: https://translationportal.epo.org/emtp/translate/?ACTION=description-retrieval&COUNTRY=CN&ENGINE=google&FORMAT=docdb&KIND=A&LOCALE=en_EP&NUMBER=110446046&OPS=ops.epo.org/3.2&SRCLANG=zh&TRGLANG=en (Year: 2019).*
Machine translation of CN 110446046 (Year: 2019).*
International Search Report issued Oct. 28, 2022 in Application No. PCT/CN2022/109578, with English Translation, pp. 1-11.
Office Action received for Chinese Patent Application No. 202110965320.0, mailed on May 22, 2025, 13 pages (6 pages of English Translation and 7 pages of Original Document).

* cited by examiner

*Primary Examiner* — Kyle M Lotfi
(74) *Attorney, Agent, or Firm* — ARENTFOX SCHIFF LLP

(57) ABSTRACT

In a method for decoding, a running state of a decoder that is performing hardware decoding on a plurality of first content data is acquired. When the running state of the decoder is determined to be in an idle state between the decoding of the plurality of first content data, second content data is acquired, the second content data being a copy of one of the plurality of first content data. Further, decoding is performed on the second content data by processing circuitry of the decoder.

20 Claims, 3 Drawing Sheets

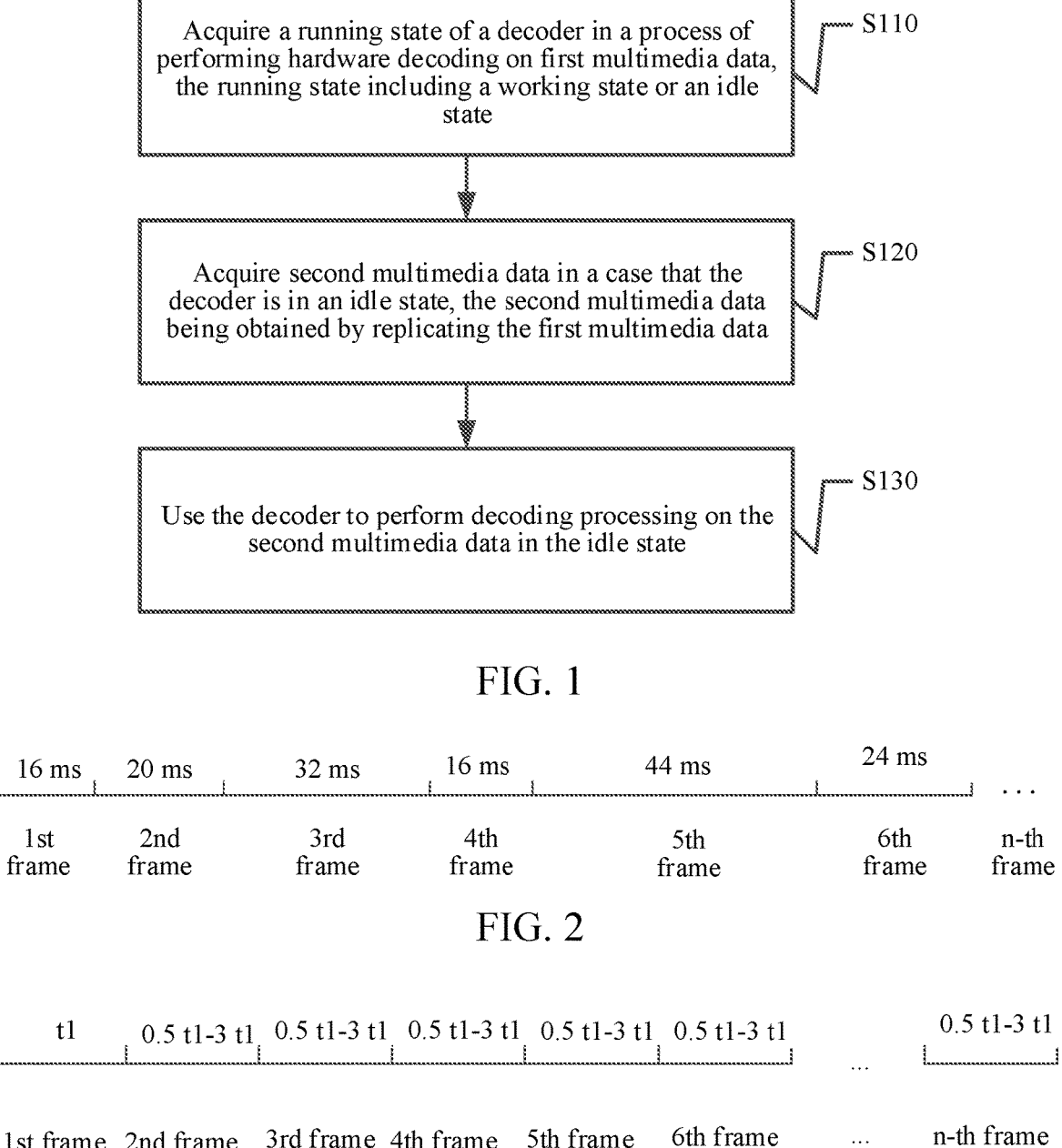

Acquire a running state of a decoder in a process of performing hardware decoding on first multimedia data, the running state including a working state or an idle state

S110

Acquire second multimedia data in a case that the decoder is in an idle state, the second multimedia data being obtained by replicating the first multimedia data

S120

Use the decoder to perform decoding processing on the second multimedia data in the idle state

| 16 ms | 20 ms | 32 ms | 16 ms | 44 ms | 24 ms | |
| 1st frame | 2nd frame | 3rd frame | 4th frame | 5th frame | 6th frame | n-th frame |

FIG. 2

| t1 | 0.5 t1-3 t1 | 0.5 t1-3 t1 | 0.5 t1-3 t1 | 0.5 t1-3 t1 | 0.5 t1-3 t1 | | 0.5 t1-3 t1 |
| 1st frame | 2nd frame | 3rd frame | 4th frame | 5th frame | 6th frame | ... | n-th frame |

FIG. 3

| 0-10 ms | 0-15 ms | 0-20 ms | 0-25 ms | 0-30 ms | 0-35 ms | | 0-40 ms |
|---------|---------|---------|---------|---------|---------|-----|---------|
| 1st-2nd frames | 2nd-3rd frames | 3rd-4th frames | 4th-5th frames | 5th-6th frames | 6th-7th frames | ... | (n-1)th-n-th frames |

Decoding processing apparatus 600

Computer device 700

DECODING PROCESSING METHOD AND APPARATUS, COMPUTER DEVICE, AND STORAGE MEDIUM

RELATED APPLICATIONS

The present application is a continuation of International Application No. PCT/CN2022/109578 filed on Aug. 2, 2022, which claims priority to Chinese Patent Application No. 202110965320.0, entitled "DECODING PROCESSING METHOD AND APPARATUS, COMPUTER DEVICE, AND STORAGE MEDIUM" and filed on Aug. 20, 2021. The entire disclosures of the prior applications are hereby incorporated by reference.

FIELD OF THE TECHNOLOGY

This disclosure relates to the field of computer technologies, including to a decoding processing method, a decoding processing apparatus, a computer device, a computer-readable storage medium, and a computer program product.

BACKGROUND OF THE DISCLOSURE

In the field of multimedia services, it may be necessary to perform decoding processing on the encoded multimedia data, and then perform page rendering on the multimedia data subjected to the decoding processing for users to view. However, in a process of performing decoding processing on the multimedia data, if the performance of a decoder is insufficient, the performance of the decoding process of the multimedia data in terms of frequency is not stable enough, resulting in video stuttering and affecting the video viewing effect.

In view of the above situation, a common practice is to call an application program interface (API) of a hardware decoder to use hardware to accelerate the video decoding process. However, after using the hardware for accelerated decoding processing, under the high requirements of ultra low latency application scenarios, inherent performance problems (e.g. the decoding speed is not fast enough and the stability is not high enough, etc.) of the decoder may occur, and these problems may reduce the efficiency of the decoding process by the hardware. Therefore, how to stabilize the performance of the decoder is a technical problem that needs to be solved at present.

SUMMARY

Embodiments of this disclosure include a decoding processing method and apparatus, a computer device, a non-transitory computer-readable storage medium, and a computer program product.

According to one aspect, a method for decoding is provided. In the method for decoding, a running state of a decoder that is performing hardware decoding on a plurality of first content data is acquired. When the running state of the decoder is determined to be in an idle state between the decoding of the plurality of first content data, second content data is acquired, the second content data being a copy of one of the plurality of first content data. Further, decoding is performed on the second content data by processing circuitry of the decoder.

According to one aspect, a decoding apparatus is provided. The processing circuitry is configured to acquire a running state of a decoder that is performing hardware decoding on a plurality of first content data. When the running state of the decoder is determined to be in an idle state between the decoding of the plurality of first content data, the processing circuitry is configured acquire second content data, the second content data being a copy of one of the plurality of first content data. Further, the processing circuitry is configured to perform decoding on the second content data.

According to one aspect, a computer device is provided. The computer device includes a memory and one or more processors, the memory storing a computer-readable instruction, and the computer-readable instruction, when executed by the one or more processors, causing the one or more processors to perform the decoding method.

According to one aspect, a non-transitory computer-readable storage medium is provided, storing instructions which when executed by a processor cause the processor to perform the decoding method.

According to one aspect, a computer program product or a computer program, the computer program product or the computer program including a computer-readable instruction stored in a computer-readable storage medium is provided. A processor of a computer device reads the computer-readable instruction from the computer-readable storage medium, and the processor executes the computer-readable instruction to cause the computer device to perform the decoding method.

Details of one or more embodiments of this disclosure are provided in the accompanying drawings and descriptions below. Other features, objectives, and advantages of this disclosure become apparent from the description, the drawings, and the claims.

BRIEF DESCRIPTION OF THE DRAWINGS

To describe the technical solutions of embodiments of this disclosure more clearly, the following briefly introduces the accompanying drawings required for describing the embodiments. The accompanying drawings in the following description show only some embodiments of this disclosure. Other embodiments are within the scope of the present disclosure.

FIG. 1 is a schematic flowchart of a decoding processing method according to an embodiment of this disclosure.

FIG. 2 is a diagram of a decoding speed time series of a decoder according to an embodiment of this disclosure.

FIG. 3 is a diagram of a reference decoding time series range according to an embodiment of this disclosure.

DESCRIPTION OF EMBODIMENTS

Figures 4, 5:
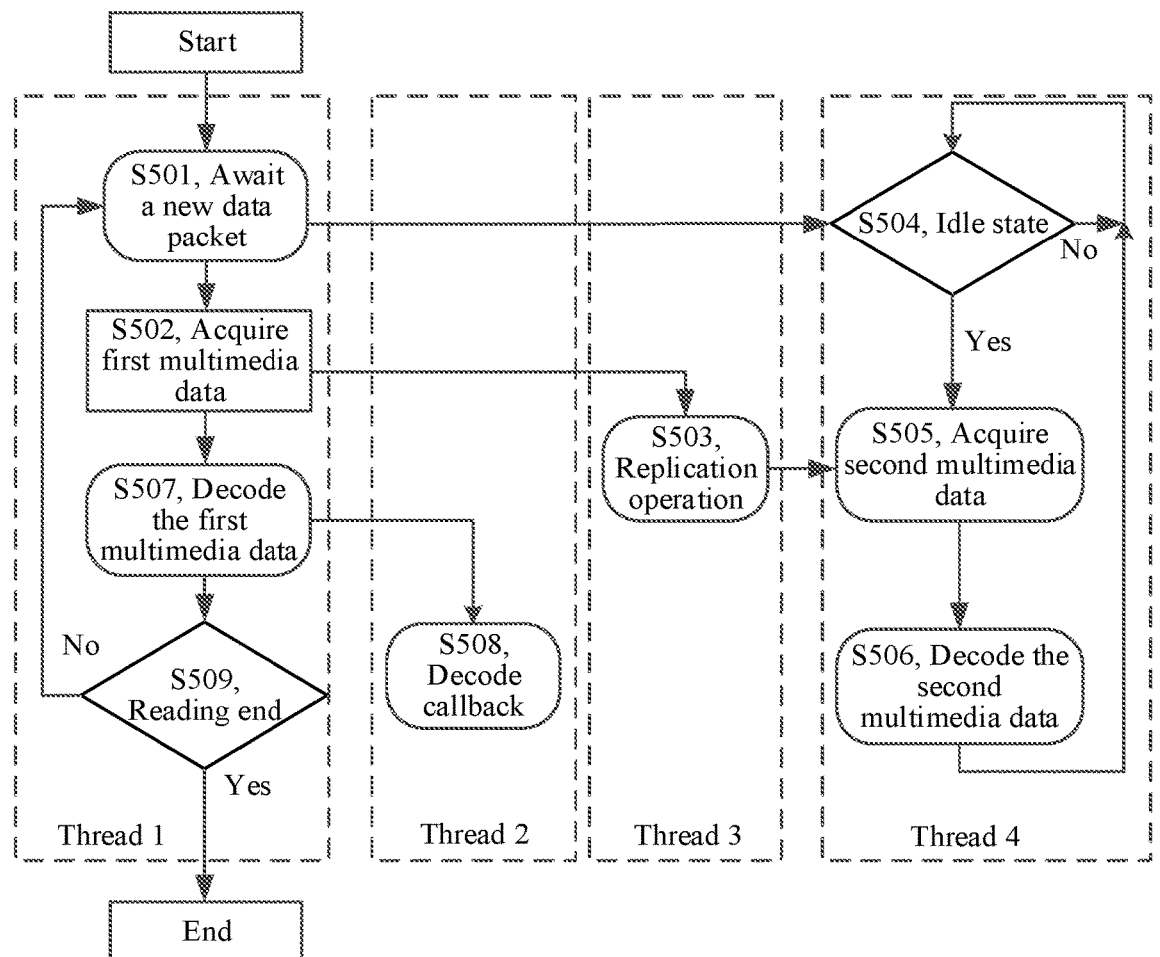
FIG. 4 is a diagram of another reference decoding time series range according to an embodiment of this disclosure.
FIG. 5 is a schematic flowchart of another decoding processing method according to an embodiment of this disclosure.

Exemplary embodiments are described in further detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with this disclosure. On the contrary, the implementations are merely examples of apparatuses and methods that are consistent with some aspects of this disclosure.

Embodiments of this disclosure include a decoding processing scheme, which can stabilize the performance of a decoder, and can enable the decoder to maintain a constant decoding frame rate and maintain the stability of a decoding speed time series. The decoding processing scheme is applicable to, for example, service scenarios that require hardware-accelerated decoding processing, such as ultra-high frame rate real-time streaming media transmission and playback scenarios, and cloud gaming decoding and rendering scenarios that require ultra low latency. Next, the principle of the decoding processing scheme is correspondingly explained:

Firstly, first content data, such as first multimedia data, that needs to be subjected to hardware decoding is acquired. The first multimedia data may include at least one of video data, audio data, or cloud gaming data, etc. Moreover, the first multimedia data may be a multimedia data stream or any data packet included in the multimedia data stream. Next, the acquired first multimedia data may be replicated to obtain second content data, such as second multimedia data. It is to be understood that the first multimedia data includes a plurality of media frames. The media frames are replicated to obtain corresponding cloned frames. The second multimedia data includes these cloned frames. Furthermore, a running state of a decoder may be acquired in a process of performing hardware decoding on the first multimedia data, the running state of the decoder including a working state or an idle state. If the acquired running state of the decoder is an idle state, the decoder may be used to perform decoding processing on the second multimedia data in the idle state. In this way, it is ensured that the decoder is always at a constant working frequency so as to improve the performance of the decoder, enable the decoder to output a constant decoding frame rate, and maintain the stability of a decoding speed time series, thereby more effectively improving the decoding efficiency.

In one implementation, the decoding processing scheme in this disclosure may be combined with the blockchain technology. For example, data such as the first multimedia data and the second multimedia data is uploaded into a blockchain for storing, which can ensure that the data on the blockchain is not prone to be tampered. Based on the scheme provided in the embodiments of this disclosure, in a process of performing hardware decoding on the first multimedia data, both the first multimedia data and the second multimedia data are sent and stored into a blockchain network, so that the second multimedia data is acquired in a case that the decoder is in an idle state. Moreover, the decoder is used to perform decoding processing on the second multimedia data in the idle state.

The following describes examples of the terminology involved in the embodiments of this disclosure.

Cloud technology can include network technologies, information technologies, integration technologies, management platform technologies, application technologies, etc. based on an application of cloud computing as a business model, can form a resource pool, can be used on demand, and is flexible and convenient. Cloud computing technology becomes an important support. A large variety of computing and storage resources are required for background services in a technical network system, such as video websites, picture websites, and more web portals. With the rapid development and application of the Internet industry, each item is likely to have a recognition mark in the future, which needs to be transmitted to a background system for logical processing. Data of different levels is processed separately. Therefore, data of various industries requires a powerful system to support, which is implemented only through cloud computing.

At present, cloud technology mainly includes cloud basic technology and cloud application. The cloud basic technology may be further divided into: cloud computing, cloud storage, database, big data, etc. The cloud application may be further divided into: medical cloud, cloud Internet of Things, cloud security, cloud calling, private cloud, public cloud, hybrid cloud, cloud gaming, cloud education, cloud conference, cloud social networking, an artificial intelligence cloud service, etc.

From the perspective of the basic technology, the decoding processing method of this disclosure may involve cloud computing in the cloud technology. From the perspective of the disclosure, the decoding processing method of this disclosure may involve cloud gaming in the cloud technology.

Cloud computing can refer to the delivery and usage mode of IT infrastructure, and refer to obtaining required resources through the network in an on-demand and easy-to-expand manner. Cloud computing in a broad sense can refer to the delivery and usage mode of services, and refer to obtaining required services through the network in an on-demand and easy-to-expand manner. Such services may be IT and software, Internet-related, or other services. In an example, cloud computing is the product of the development and fusion of traditional computer and network technologies such as grid computing, distributed computing, parallel computing, utility computing, network storage technology, virtualization, and load balance.

Cloud gaming, which can also be referred to as gaming on demand, includes an online gaming technology based on cloud computing technology. Cloud gaming technology enables thin clients with relatively limited graphics processing and data computing capabilities to run high-quality games. In a cloud gaming scenario, the games do not run on a player's game terminal, but run on a cloud server, and the cloud server renders the gaming scenario into a video and audio stream, which is transmitted to the player's game terminal through the network. The player's game terminal does not need to have specific graphics processing and data computing capabilities, but only needs to have the basic streaming media playback capability and the capabilities to acquire player input commands and send the same to the cloud server.

The decoding processing scheme provided in this disclosure involves larger-scale computing and requires larger computing power and storage space. Therefore, in one implementation of this disclosure, a computer device may acquire sufficient computing power and storage space through the cloud gaming technology.

Furthermore, the decoding processing scheme provided in this disclosure may be applied to the cloud gaming scenario, and cloud gaming data (such as game image data and game audio data) in the cloud gaming scenario may be used as the first multimedia data, and then hardware-accelerated decoding processing is performed on the cloud gaming data, which can stabilize the decoding performance of a decoder of a game client to a greater extent, thereby improving the user's game experience.

For the descriptions of the decoding processing scheme mentioned above, examples of the following items are provided.

(1) The decoding processing scheme mentioned above may be executed by a computer device. The computer device may be a terminal device or a server. The terminal device may be a mobile phone, a tablet computer, a notebook computer, a handheld computer, a mobile Internet device (MID), a vehicle, a vehicle-mounted device, a roadside device, an aircraft, a smart wearable device (such as a smart watch, a smart bracelet, and a pedometer), a smart TV and other devices with a decoding processing function, etc. The server may be an independent physical server, may also be a server cluster or a distributed system includes a plurality of physical servers, and may further be a cloud server that provides basic cloud computing services such as cloud services, cloud databases, cloud computing, cloud functions, cloud storage, network services, cloud communication, middleware services, domain name services, security services, content delivery networks (CDNs), big data, and artificial intelligence platforms.

(2) The computer device mentioned above, in some embodiments, is provided with an Intel central processing unit (CPU) integrated graphics card, and a video hardware decoding operation is performed by a video decoding module of the Intel CPU integrated graphics card used in a service scenario.

(3) The decoding processing scheme mentioned above may be combined with the blockchain technology. Furthermore, in this disclosure, a process of decoding the second multimedia data by using the decoder may be executed on the blockchain, which can not only ensure the fairness of the decoding process, but also make the decoding process traceable, thereby improving the security of the decoding process.

(4) The decoding processing scheme mentioned above may be applied to a decoding processing module of a client in the cloud gaming scenario, and may also be applied to any service scenario that requires ultra low latency hardware video decoding. Through the high-performance decoding mode of the decoding processing scheme provided in this disclosure, the hardware decoding speed can be improved. The decoder is used to perform decoding processing on the cloned multimedia data in the idle state, so that the stability of the decoding speed time series can be guaranteed, and a solid foundation is laid for the ultimate user experience at the product side.

Based on the analyses above, the following describes the decoding processing method in this disclosure with reference to FIG. 1. FIG. 1 is a schematic flowchart of a decoding processing method according to an embodiment of this disclosure. The decoding processing method may be performed by a computer device. The computer device is, for example, a vehicle-mounted device, a smartphone, a tablet computer, a smart wearable device, and other terminal devices having a decoder installed. As shown in FIG. 1, the decoding processing method includes steps S110 to S130.

In step S110, a running state of a decoder is acquired in a process of performing hardware decoding on first multimedia data, the running state including a working state or an idle state.

The first multimedia data may be any data packet in a multimedia data stream, and may also be one single piece of data. The first multimedia data may include, but is not limited to: at least one of video data, audio data, or cloud gaming data, etc. Moreover, the first multimedia data is data encoded by an encoder. A data format of the first multimedia data may include, but is not limited to: H.264 format (which is a new generation of video compression format specified by the international telecommunication union), a moving picture experts group-4 (MPEG-4) format, which is an international standard dynamic image format, etc. The data format of the first multimedia data is not limited in the embodiments of this disclosure.

The hardware decoding refers to decoding a video through hardware, and is performed by processing circuitry, such as a graphics processing unit (GPU). Decoding by the GPU can reduce the workload of the CPU and reduce power consumption. A decoding processing scenario involved in the embodiments of this disclosure is mainly a hardware decoding scenario. Therefore, the decoder in the embodiments of this disclosure may refer to a decoding module in an Intel CPU integrated graphics card in a computer device, as an example. The decoding module may include a video decoding module, an audio decoding module, etc.

In one implementation, after the first multimedia data is acquired, a performance parameter of the decoder is acquired. If it is determined, according to the performance parameter of the decoder, that the performance of the decoder does not meet a scenario requirement, the step of acquiring a running state of a decoder is then triggered to be performed. In addition, if it is determined, according to the performance parameter of the decoder, that the performance of the decoder meets the scenario requirement, decoding processing is directly performed on the first multimedia data through a related decoding processing method. The performance parameter of the decoder may include, but is not limited to: decoding time, decoding speed, stability of the decoding speed time series, and other parameters. That is, in some embodiments of this disclosure, after the first multimedia data is acquired, it is pre-determined whether the performance of the decoder meets the scenario requirement; if the performance of the decoder does not meet the scenario requirement, the performance of the decoder may be stabilized in a specific scenario by performing the decoding processing method provided in some embodiments of this disclosure. The specific scenario includes a service scenario that requires high performance of the decoder, such as an ultra-high frame rate real-time streaming media transmission and playback scenario and an ultra low latency cloud gaming decoding and rendering scenario.

The acquired running state of the decoder may include a working state or an idle state. In one implementation, if the running state of the decoder is switched from an idle state to a working state, the decoding processing of the second multimedia data is paused. The working state refers to a state where the decoder is performing decoding processing on the received multimedia data. Moreover, the idle state refers to a state where the decoder is awaiting to receive multimedia data or is not performing decoding processing on the received multimedia data. For example, assume that a decoding rate of the decoder is 60 frames per second (fps, that is, the decoder decodes 60 frames of data per second), the decoder receives one piece of multimedia data every 16 ms. Therefore, the decoder is in a working state in a time period when the decoder performs decoding processing on the received multimedia data. Moreover, the decoder is in an idle state at a time period (e.g. 16 ms) when the decoder is awaiting to receive each piece of multimedia data. It is to be understood that, when the decoding processing that is being performed by the decoder is paused, interrupted, etc., the decoder may enter an idle state from a working state. Similarly, pausing, interruption, and other situations of the decoder are handled or restored, the decoder may enter a working state from an idle state. If the running state of the decoder is switched from an idle state to a working state, the decoding processing of the second multimedia data is paused. The decoder performs decoding processing on the received multimedia data in priority, which can improve the decoding efficiency of the decoder and ensure the ordered decoding of the multimedia data.

In one implementation, the first multimedia data may refer to a multimedia data stream. The multimedia data stream may include N data packets, and M media frames are encapsulated in each data packet, N and M being both positive integers. Therefore, when receiving an i-th data packet of the multimedia data stream, the decoder may replicate the i-th data packet to obtain a cloned packet of the i-th data packet. The i-th data packet may be any data packet in the multimedia data stream, i being a positive integer, and i being less than or equal to N. Moreover, the second multimedia data includes the cloned packet of the i-th data packet. In this case, the decoder is in a working state, performs decoding processing on media frames in the i-th data packet, and outputs the media frames subjected to the decoding processing in the i-th data packet.

During an exemplary implementation, assume that the multimedia data stream is a video data stream, and the media frame is an image frame, an audio frame, or a cloud gaming data frame, etc. Therefore, in a process of performing hardware decoding on a video data stream, when the decoder acquires any data packet in the video data stream, the decoder may replicate the acquired data packet. That is, the decoder performs a cloneVideoPkt operation to obtain a cloned new packet of the data packet. Therefore, the second multimedia data includes the cloned new packet obtained by replication. When the decoder is in a working state, the decoder may sequentially perform decoding processing on media frames included in the acquired data packet, and then sequentially outputs the media frames subjected to the decoding processing frame by frame. In this way, the decoding processing is performed in units of data packets, and the replication processing is performed in units of data packets, which can more effectively guarantee the orderliness of data processing and avoid data confusion. In one implementation, each media frame in the data packet may carry a media identifier. The media identifier of each media frame is used for indicating a position and sequence of the media frame in the data packet. The decoder may sequentially perform decoding processing on the media frames according to the media identifiers carried in the media frames, and sequentially outputs, according to the media identifiers carried in the media frames, the media frames subjected to the decoding processing. The media identifier includes, but is not limited to: a character, a number or a string, etc., which is not limited in the embodiments of this embodiment.

In step S120, second multimedia data is acquired in a case that the decoder is in an idle state, the second multimedia data being obtained by replicating the first multimedia data.

In one implementation, the first multimedia data may refer to a multimedia data stream. The multimedia data stream may include N data packets. M media frames are encapsulated in each data packet. Therefore, when acquiring an i-th data packet of the multimedia data stream, the decoder may replicate the i-th data packet to obtain a cloned packet of the i-th data packet, so that the second multimedia data may include the cloned packet of the i-th data packet.

In another implementation, when receiving an (i+1)-th data packet of the multimedia data stream, the decoder may replicate the (i+1)-th data packet to obtain a cloned packet of the (i+1)-th data packet. In addition, the cloned packet of the i-th data packet may be deleted, so that the second multimedia data includes the cloned packet of the (i+1)-th data packet. That is, when the decoder acquires a new data packet, the decoder may replace, with a cloned packet obtained by replicating the data packet, a cloned packet of a previous data packet. In this way, the latest cloned packet is stored in a memory of the decoder, so that the storage burden is reduced, and the cache pressure of the memory is reduced, thereby further improving the performance of the decoder.

In step S130, the decoder is used to perform decoding processing on the second multimedia data in the idle state.

In one implementation, the second multimedia data may include the cloned packet of the i-th data packet. The cloned packet of the i-th data packet includes M cloned frames. The M cloned frames have one-to-one correspondence to the M media frames in the i-th data packet. The step of using the decoder to perform decoding processing on the second multimedia data in the idle state may refer to: using the decoder to perform decoding processing on the cloned frames in the cloned packet of the i-th data packet in the idle state. In this way, data in the cloned packet of the i-th data packet have one-to-one correspondence to data in the i-th data packet. In the idle state, the decoder does not need to perform complex decoding processing, but only needs to conveniently perform decoding processing on the cloned frames in the cloned packet, which reduces the decoding pressure of the decoder in the idle state.

In the process of performing hardware decoding on the first multimedia data, a performance parameter of the decoder may be acquired. If the performance parameter of the decoder does not meet a performance indicator requirement, the step of acquiring a running state of a decoder is triggered to perform.

In one implementation, the performance parameter of the decoder includes an actual decoding duration of the first multimedia data, and the performance indicator requirement includes a reference decoding frame rate. Therefore, an actual decoding frame rate of the decoder may be determined according to the actual decoding duration of the first multimedia data. If the actual decoding frame rate of the decoder is less than the reference decoding frame rate, it is determined that the performance parameter of the decoder does not meet the performance indicator requirement.

The actual decoding duration of the first multimedia data may refer to a real decoding duration of the first multimedia data. The decoding frame rate may refer to the number of media frames that can be decoded per second. The actual decoding frame rate may refer to a real decoding frame rate of the decoder. The reference decoding frame rate may refer to an expected decoding frame rate of the decoder, that is, an acceptable decoding frame rate.

For example, assume that the decoder has an actual decoding duration of 20 ms, and a reference decoding frame rate of 60 fps. The decoding frame rate refers to the number of media frames that can be decoded per second. Therefore, a relation between the decoding duration and the decoding frame rate may be expressed as: Decoding duration $t=1,000/fps$ (ms). Therefore, according to the actual decoding duration of 20 ms of the decoder for the first multimedia data, it can be determined that the actual decoding frame rate of the decoder is $1,000/20=50$ fps. The actual decoding frame rate (50 fps) of the decoder is less than the reference decoding frame rate (60 fps); therefore, it is determined that the performance parameter of the decoder does not meet the performance indicator requirement. For another example, assume that the decoder has an actual decoding duration of 10 ms for the first multimedia data, and a reference decoding frame rate is 60 fps. Therefore, according to the actual decoding duration of 10 ms of the decoder for the first multimedia data, it is determined that the actual decoding frame rate of the decoder is 1,000/10=100 fps. The actual decoding frame rate (100 fps) of the decoder is greater than the reference decoding frame rate (60 fps); therefore, it is determined that the performance parameter of the decoder meets the performance indicator requirement. In this way, if the actual decoding frame rate of the decoder is less than the reference decoding frame rate, it is determined that the performance parameter of the decoder does not meet the performance indicator requirement. In this case, the step of acquiring a running state of a decoder is triggered to perform, so that the decoder maintains a continuous and stable working frequency, thereby increasing the decoding frame rate of the decoder, stabilizing the performance of the decoder, and improving the decoding efficiency.

In another implementation, the first multimedia data includes a plurality of media frames. The performance parameter of the decoder includes an actual decoding duration of each media frame in the first multimedia data. The performance indicator requirement includes a reference decoding time series range. Therefore, a decoding speed time series of the decoder may be calculated according to the actual decoding duration of each media frame. If the decoding speed time series of the decoder exceeds the reference decoding time series range, it is determined that the performance parameter of the decoder does not meet the performance indicator requirement.

The actual decoding duration of the media frame may refer to a real decoding duration of the media frame. The decoding speed time series includes actual decoding durations of the media frames in the first multimedia data. The reference decoding time series range may refer to an expected decoding time series range. The decoding time series range may refer to an acceptable decoding duration interval.

For example, assume that the first media data includes n media frames, n being a positive integer. Then, the decoding speed time series of the decoder is obtained based on the actual decoding duration of each media frame. FIG. 2 is a diagram of a decoding speed time series of a decoder according to some embodiments of this disclosure. As shown in FIG. 2, the decoding speed time series of the decoder includes actual decoding durations of the media frames included in the first multimedia data. For example, an actual decoding duration t1 of the first frame is 16 ms, an actual decoding duration t2 of the second frame is 20 ms, an actual decoding duration t3 of the third frame is 32 ms, an actual decoding duration t4 of the fourth frame is 16 ms, an actual decoding duration t5 of the fifth frame is 44 ms, and an actual decoding duration t6 of the sixth frame is 24 ms. Therefore, the decoding speed time series of the decoder includes the actual decoding durations of the media frames. In addition, the computer device may acquire the reference decoding time series range. FIG. 3 is a diagram of a reference decoding time series range according to an embodiment of this disclosure. In one implementation, the reference decoding time series range includes reference decoding duration ranges respectively corresponding to the media frames. The reference decoding duration ranges respectively corresponding to the media frames may be set in advance. The reference decoding duration ranges respectively corresponding to the media frames may be the same or different. In one implementation, the reference decoding time series range may be determined according to the actual decoding duration of the first frame. The reference decoding duration ranges respectively corresponding to the media frames are determined according to an actual decoding duration of a first media frame in the first multimedia data. The first media frame refers to the first frame in the first multimedia data. For example, assume that the actual decoding duration of the first media frame in the first multimedia data is t1, reference decoding duration ranges corresponding to all media frames in the first multimedia data are: 0.5 t1-3 t1. That is, all the media frames correspond to the same reference decoding duration ranges (0.5 t1-3 t1). In this way, the reference decoding duration ranges respectively corresponding to the media frames may be quickly determined according to an actual decoding duration of one media frame so as to quickly determine the reference decoding time series ranges. For example, if actual decoding durations of the remaining (n−1) media frames fall within the reference decoding duration range, the decoding speed time series of the decoder does not exceed the reference decoding time series range; therefore, it is determined that the performance parameter of the decoder meets the performance indicator requirement. If an actual decoding duration of one media frame among the remaining (n−1) media frames does not fall within the reference decoding duration range, the decoding speed time series of the decoder exceeds the reference decoding time series range; therefore, it is determined that the performance parameter of the decoder does not meet the performance indicator requirement.

In this way, if the decoding speed time series of the decoder exceeds the reference decoding time series range, it is determined that the performance parameter of the decoder does not meet the performance indicator requirement. In this case, the step of acquiring a running state of a decoder is triggered to perform, so that the decoder maintains a continuous and stable working frequency, thereby shortening the decoding speed time series of the decoder, stabilizing the performance of the decoder, and improving the decoding efficiency.

In another implementation, furthermore, it may also be determined, based on a proportion threshold, whether the decoding speed time series of the decoder exceeds the reference decoding time series range. The reference decoding time series range includes reference decoding duration ranges respectively corresponding to the media frames in the first multimedia data. A target proportion of media frames of which actual decoding durations do not fall within the reference decoding duration ranges is determined according to an actual decoding duration and a reference decoding duration range corresponding to a same media frame in the first multimedia data. If the target proportion is greater than or equal to the proportion threshold, it is determined that the decoding speed time series of the decoder exceeds the reference decoding time series range.

In one implementation, the target proportion of media frames of which actual decoding durations do not fall within the reference decoding duration ranges refers to a proportion of media frames among all the media frames in the first multimedia data of which actual decoding durations do not fall within the reference decoding duration range. For example, the first multimedia data includes 10 media frames, and the number of media frames of which actual decoding durations do not fall within the reference decoding duration ranges is 5; therefore, a target proportion of the media frames is 5/10=0.5.

In one implementation, if the reference decoding time series range is determined according to an actual decoding duration of a first media frame in the first multimedia data, the target proportion of media frames of which actual decoding durations do not fall within the reference decoding duration ranges may refer to a proportion of media frames among all the media frames other than the first media frame in the first multimedia data of which actual decoding durations do not fall within the reference decoding duration range, or may refer to a proportion of media frames among all the media frames in the first multimedia data of which actual decoding durations do not fall within the reference decoding duration range.

For example, assume that the actual decoding duration of the first media frame in the first multimedia data is t1, reference decoding duration ranges corresponding to all media frames in the first multimedia data are: 0.5 t1-3 t1. A proportion threshold may be set in advance. The number of media frames among (n−1) media frames of which reference decoding duration ranges do not fall within a reference decoding duration range is determined according to an actual decoding duration and a reference decoding duration range (0.5 t1-3 t1) of the (n−1) media frames. Assume that the number is k, k being a positive integer and k being less than or equal to (n−1). A proportion k/n−1 of the media frames which do not fall within the reference duration range is then calculated. According to k/n−1 and the proportion threshold, it is determined whether the decoding speed time series of the decoder exceeds the reference decoding time series range. If k/n−1 is less than the proportion threshold, it is determined that the performance parameter of the decoder meets the performance indicator requirement. If k/n−1 is greater than or equal to the proportion threshold, it is determined that the performance parameter of the decoder does not meet the performance indicator requirement.

The proportion threshold may be adaptively adjusted according to a scenario requirement, or manually set according to experience, which is not specifically limited in the embodiments of this disclosure.

In this way, according to the target proportion and the proportion threshold, it is determined whether the decoding speed time series of the decoder exceeds the reference decoding time series range, so that when actual decoding durations of most media frames in the first multimedia data are expired, it is determined that the decoding speed time series of the decoder exceeds the reference decoding time series range, which more effectively guarantees the determination accuracy.

In another implementation, the reference decoding time series range includes reference decoding duration ranges corresponding to two adjacent media frames. The reference decoding duration ranges corresponding to any two adjacent media frames may be the same or different. If the reference decoding duration ranges corresponding to any two adjacent media frames are different, it is roughly equivalent to reference decoding duration ranges corresponding to the media frames being different. Assume that the actual decoding duration of the first frame is t1, the actual decoding duration of the second frame is t2, the actual decoding duration of the third frame is t3, . . . , and the actual decoding duration of an n-th frame is tn. Assume that a reference decoding duration range (an absolute value) between t1 and t2 may be: $0 \le t2-t1 \le max1$, a reference decoding duration range between t2 and t3 may be: $0 \le t3-t2 \le max2$, a reference decoding duration range between t3 and t4 may be: $0:t4-t3 \le max3$, . . . , and a reference decoding duration range between tn−1 and tn may be: $0 \le tn-tn-1 \le maxn-1$, max1, max2, max3, . . . , and maxn−1 being different. At least two pieces of identical data may also exist.

For example, FIG. 4 is a diagram of another reference decoding time series range according to an embodiment of this disclosure. Firstly, according to the diagram of the decoding speed time series of the decoder shown in FIG. 2, it is determined that a decoding duration difference between the first frame and the second frame is: 20 ms-16 ms=4 ms, a decoding duration difference between the second frame and the third frame is: 32 ms-20 ms=12 ms, and so on, and decoding duration differences of 16 ms, 28 ms, 20 ms, etc. are sequentially obtained. Then, assume that a decoding duration range between two adjacent media frames is shown in FIG. 4, that is, a reference decoding duration range between the first frame and the second frame is: 0-10 ms, a reference decoding duration range between the second frame and the third frame is: 0-15 ms, and so on, and a reference decoding duration range between the fifth frame and the sixth frame is: 0-30 ms. One reference decoding duration range corresponds to one decoding duration difference (that is, a difference between actual decoding durations of any two adjacent media frames). Then, based on the determined decoding duration difference between the any two adjacent media frames, it is sequentially determined whether decoding duration differences between any two adjacent media frames fall within corresponding reference decoding duration ranges. For example, the decoding duration difference between the first frame and the second frame is 4 ms, which falls within the corresponding reference decoding duration range (0-10 ms), and the decoding duration difference between the second frame and the third frame is 12 ms, which also falls within the corresponding reference decoding duration range (0-15 ms). For another example, the decoding duration difference between the fourth frame and the fifth frame is 28 ms, which does not fall within the corresponding reference decoding duration range (0-25 ms). Finally, if the decoding duration differences between any two adjacent media frames all fall within the corresponding reference decoding duration ranges, it is determined that the performance parameter of the decoder meets the performance indicator requirement. If the decoding duration differences between two adjacent media frames do not fall within the corresponding reference decoding duration ranges, it is determined that the decoding speed time series of the decoder exceeds the reference decoding time series range, that is, it is determined that the performance parameter of the decoder does not meet the performance indicator requirement.

Through the manner, according to the performance parameter of the decoder, it is pre-determined whether the decoder meets the performance indicator requirement. The performance indicator requirements in different service scenarios may be different. If the decoder does not meet the performance indicator requirement, the performance of the decoder may be optimized and the working efficiency of the decoder may be improved through the decoding processing method provided in the embodiments of this disclosure.

Some embodiments of this disclosure may be applied to a cloud gaming scenario. That is, the first multimedia data may refer to a cloud gaming video stream; therefore, a scenario requirement of a cloud gaming may be acquired, the scenario requirement being used for indicating a decoding mode of the cloud gaming video stream. If the scenario requirement indicates that an accelerated decoding mode is used for the cloud gaming video stream, the running state of the decoder is acquired in the process of performing hardware decoding on the cloud gaming video stream.

In one implementation, when developing the cloud gaming, game developers may preset a game mode of the game as an accelerated decoding mode. Therefore, in the cloud gaming scenario, the decoding processing scheme provided in the embodiments of this disclosure may be used to perform hardware-accelerated decoding processing on the cloud gaming video stream, which can stabilize the decoding performance of a decoder of a game client to a greater extent, thereby improving the user's game experience.

In another implementation, the scenario requirement of the cloud gaming may be determined according to a network environment of the game client where the game runs. If a network environment of a game client where user A is located is a weak network environment, it is determined that the scenario requirement of the cloud gaming indicates that an accelerated decoding mode needs to be used for the cloud gaming video stream. If a network environment of a game client where user B is located is a strong network environment, it is determined that the scenario requirement of the cloud gaming indicates that an accelerated decoding mode does not need to be used for the cloud gaming video stream.

In the ultra-high frame rate real-time streaming media transmission and playback scenario, the ultra low latency cloud gaming decoding and rendering scenario, etc., the embodiments of this disclosure can solve the problems of long decoding time and poor stability of the time series which may occur in the scenario that requires ultra low latency hardware decoding so as to guarantee the smooth and stable video decoding performance, thereby providing the ultimate user experience for services that require ultra low latency such as cloud gaming.

In an embodiment of this disclosure, a running state of a decoder is acquired in a process of performing hardware decoding on the first multimedia data, the running state including an idle state or a working state. If the running state of the decoder is an idle state, second multimedia data obtained by replicating the first multimedia data is acquired, and the decoder is used to perform decoding processing on the second multimedia data in the idle state. According to this disclosure, in the process of performing, by the decoder, hardware decoding on the first multimedia data, the cloned first multimedia data is decoded in the idle state of the decoder, so that the decoder maintains a continuous and stable working frequency, thereby stabilizing the performance of the decoder and improving the decoding efficiency thereof.

FIG. 5 is a schematic flowchart of another decoding processing method according to an embodiment of this disclosure. As shown in FIG. 5, the decoding processing method is performed by the decoder. A first thread, a second thread, a third thread, and a fourth thread run in parallel in the decoder. With reference to the decoding processing method in t FIG. 1, as an example, the first threshold (thread 1) shown in FIG. 5 is used for: performing hardware decoding on the first multimedia data. The second thread (thread 2) is used for: sequentially outputting the first multimedia data subjected to the decoding processing. The third thread (thread 3) is used for: replicating the first multimedia data to obtain the second multimedia data. The fourth thread (thread 4) is used for: acquiring the running state of the decoder, and acquiring and decoding the second multimedia data in a case that the decoder is in an idle state.

The following describes an example of performing, by the decoder, hardware decoding processing on the multimedia data stream in further detail. In an example, the multimedia data stream includes a plurality of data packets. Next, the decoding processing method provided in an embodiment of this disclosure is further described in detail with reference to FIG. 5. The decoding processing method shown in FIG. 5 includes steps S501 to S509.

In step S501, a new data packet is awaited.

In one implementation, the multimedia data stream is based on streaming. Streaming means, for example, that data packets in the multimedia data stream are transmitted one after another. That is, when acquiring a data packet in the multimedia data stream, the decoder completes performing decoding processing on the data packet, and then awaits to acquire the next data packet, and performs decoding processing on the next data packet, and so on. A duration when a new data packet needs to be awaited may be determined according to a decoding frame rate of the decoder. A decoding duration $t=1{,}000/fps$ (ms). For example, the decoding frame rate of the decoder is 60 fps, and after acquiring a first data packet, the decoder needs to await for $t=1{,}000/60=16$ ms before receiving the next data packet.

In step S502, first multimedia data is acquired.

In an embodiment of this disclosure, the first multimedia data may be any data packet among N data packets included in the multimedia data stream, and M media frames are encapsulated in each data packet, N and M being both positive integers. That is, M media frames are encapsulated in the first multimedia data acquired by thread 1 running in the decoder. Each media frame includes, but is not limited to: an image frame, an audio frame, a cloud gaming video frame, etc.

In step S503, a replication operation is performed.

In one implementation, when acquiring a new data packet, the decoder may simultaneously start thread 3 to perform a cloneVideoPkt operation (a replication operation) on the data packet to obtain a cloned new packet (second multimedia data).

In step S504, whether a decoder state is an idle state is determined.

In one implementation, thread 4 acquires a running state (including an idle state or a working state) of the decoder, and determines whether the running state of the decoder is an idle state. If the running state of the decoder is an idle state, the operation of acquiring the second multimedia data by thread 4 is triggered to perform. The idle state refers to whether the decoder is in a state where the decoder is awaiting to receive a new data packet; if yes, it is determined that the running state of the decoder is an idle state.

In step S505, second multimedia data is acquired.

In one implementation, if the running state of the decoder is an idle state, thread 4 may acquire the second multimedia data. The second multimedia data may also include a cloned packet of any data packet. For example, the second multimedia data acquired by thread 4 is a cloned packet obtained by cloning a current data packet acquired by thread 1, or the second multimedia data is a cloned packet obtained by cloning a previous data packet acquired by thread 1. Moreover, the cloned packet of the previous data packet is replaced with a cloned packet of the latest data packet, which can reduce the storage burden of the decoder.

In step S506, the second multimedia data is decoded.

In one implementation, thread 4 may perform a decodeClonePacket operation in the idle state, that is, thread 4 running in the decoder performs decoding processing on the second multimedia data. The second multimedia data includes M cloned frames. The M cloned frames have one-to-one correspondence to the M media frames in the first multimedia data. Therefore, the decoder performs decoding processing on the second multimedia data, which means that the decoder sequentially performs decoding processing on the M cloned frames.

In one implementation, if the running state of the decoder is switched from the idle state to a working state, thread 4 pauses decoding processing of the second multimedia data.

In step S507, the first multimedia data is decoded.

In one implementation, after acquiring the first multimedia data, thread 1 may perform decoding processing on the first multimedia data. The decoder performs a decodeOneFrame operation, that is, the decoder performs decoding processing on the first multimedia data, which means that the decoder sequentially performs decoding processing on the M media frames.

In step S508, a decode callback is performed.

In one implementation, decode callback may refer to: sequentially outputting, by thread 2, the M media frames subjected to the decoding processing included in the first multimedia data.

In step S509, whether reading is ended is determined.

In one implementation, after completing decoding processing of a data packet, thread 1 may determine whether reading of a current multimedia data stream is ended; if yes, it is determined that the decoding processing of the multimedia data stream is completed; if not, the next new data packet is continued to be awaited, and the step above is repeated performing until reading of the multimedia data stream is ended. If it is detected that a current data packet carries an end identifier, it is determined that reading of the multimedia data stream is ended.

The step numbers in steps S501 to S509 are not used to limit the execution orders of the steps. For example, step S502 and step S503 may be simultaneously performed. For another example, step S506 may be performed prior to step S507, or step S506 may be performed after step S507.

In an embodiment of this disclosure, a running state of a decoder is acquired in a process of performing hardware decoding on the first multimedia data, the running state including an idle state or a working state. If the running state of the decoder is an idle state, second multimedia data obtained by replicating the first multimedia data is acquired, and the decoder is used to perform decoding processing on the second multimedia data in the idle state. According to this disclosure, in the process of performing, by the decoder, hardware decoding on the first multimedia data, the cloned first multimedia data is decoded in the idle state of the decoder, so that the decoder maintains a continuous and stable working frequency, thereby stabilizing the performance of the decoder and improving the decoding efficiency thereof.

It is to be understood that although the steps are displayed sequentially according to the instructions of the arrows in the flowcharts of the embodiments, these steps are not necessarily performed sequentially according to the sequence instructed by the arrows. Unless otherwise explicitly specified in this disclosure, execution of the steps is not strictly limited, and the steps may be performed in other sequences. Moreover, at least some of the steps in each embodiment may include a plurality of steps or a plurality of stages. The steps or stages are not necessarily performed at the same moment but may be performed at different moments. Execution of the steps or stages is not necessarily sequentially performed, but may be performed alternately with other steps or at least some of steps or stages of other steps.

Figure 6:
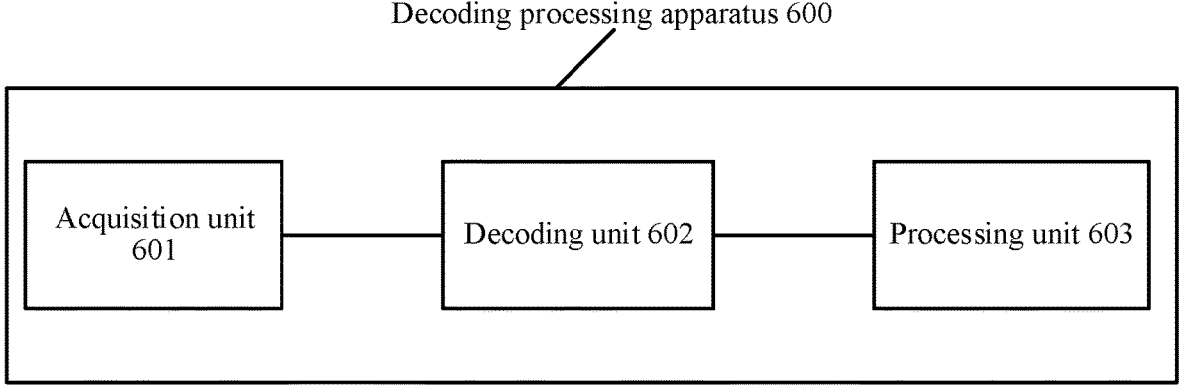
FIG. 6 is a schematic structural diagram of a decoding processing apparatus according to an embodiment of this disclosure.

FIG. 6 is a schematic structural diagram of a decoding processing apparatus according to an embodiment of this disclosure. The decoding processing apparatus 600 may be applied to the computer device in the method embodiments corresponding to FIG. 1 and FIG. 5. The decoding processing apparatus 600 may be a computer program (including a program code) running in the computer device. For example, the decoding processing apparatus 600 is application software. The apparatus may be configured to perform the corresponding steps of the method provided in the embodiments of this disclosure. The decoding processing apparatus 600 may include an acquisition unit 601 and a decoding unit 602.

The acquisition unit 601 is configured to acquire a running state of a decoder in a process of performing hardware decoding on first multimedia data, the running state including a working state or an idle state.

The acquisition unit 601 is further configured to acquire second multimedia data in a case that the decoder is in an idle state, and the second multimedia data being obtained by replicating the first multimedia data.

The decoding unit 602 is configured to use the decoder to perform decoding processing on the second multimedia data in the idle state.

In one implementation, the decoding unit 602 is further configured to: pause decoding processing of the second multimedia data if the running state of the decoder is switched from the idle state to a working state.

In one implementation, the first multimedia data refers to a multimedia data stream. The multimedia data stream includes N data packets, and M media frames are encapsulated in each data packet, N and M being both positive integers. The decoding processing apparatus 600 may further include a processing unit 603.

The processing unit 603 is configured to replicate an i-th data packet of the multimedia data stream in a case that the decoder receives the i-th data packet to obtain a cloned packet of the i-th data packet, the second multimedia data including the cloned packet of the i-th data packet, i being a positive integer, and i being less than or equal to N.

The decoding unit 602 is further configured to: perform decoding processing on media frames in the i-th data packet in a case that the decoder is in a working state, and output the media frames subjected to the decoding processing in the i-th data packet.

In one implementation, the cloned packet of the i-th data packet includes M cloned frames, and the M cloned frames have one-to-one correspondence to the M media frames in the i-th data packet. The decoding unit 602 may be configured to: use the decoder to perform decoding processing on the cloned frames in the cloned packet of the i-th data packet in the idle state.

In one implementation, the processing unit 603 is further configured to: replicate an (i+1)-th data packet of the multimedia data stream in a case that the decoder receives the (i+1)-th data packet to obtain a cloned packet of the (i+1)-th data packet.

The processing unit 603 is further configured to delete the cloned packet of the i-th data packet, so that the second multimedia data includes the cloned packet of the (i+1)-th data packet.

In one implementation, the acquisition unit 601 is further configured to: acquire a performance parameter of the decoder in the process of performing hardware decoding on the first multimedia data; and trigger to perform the step of acquiring a running state of a decoder if the performance parameter of the decoder does not meet a performance indicator requirement.

In one implementation, the performance parameter of the decoder includes an actual decoding duration of the first multimedia data, and the performance indicator requirement includes a reference decoding frame rate. The processing unit 603 is further configured to determine an actual decoding frame rate of the decoder according to the actual decoding duration. The processing circuitry is configured to determine that the performance parameter of the decoder does not meet the performance indicator requirement in a case that the actual decoding frame rate of the decoder is less than the reference decoding frame rate.

In one implementation, the first multimedia data includes a plurality of media frames. The performance parameter of the decoder includes an actual decoding duration of each media frame in the first multimedia data. The performance indicator requirement includes a reference decoding time series range. The processing unit 603 is further configured to calculate a decoding speed time series of the decoder according to the actual decoding duration of each media frame. The processing circuitry is configured to determine that the performance parameter of the decoder does not meet the performance indicator requirement in a case that the decoding speed time series of the decoder exceeds the reference decoding time series range.

In one implementation, the reference decoding time series range includes reference decoding duration ranges respectively corresponding to the media frames. The processing unit 603 is further configured to determine, according to an actual decoding duration and a reference decoding duration range corresponding to a same media frame, a target proportion of media frames of which actual decoding durations do not fall within the reference decoding duration ranges. The processing circuitry is configured to determine that the decoding speed time series of the decoder exceeds the reference decoding time series range in a case that the target proportion is greater than or equal to the proportion threshold.

In one implementation, the processing unit 603 is further configured to determine, according to an actual decoding duration of a first media frame in the first multimedia data, the reference decoding duration ranges respectively corresponding to the media frames.

In one implementation, a first thread, a second thread, a third thread, and a fourth thread run in parallel in the decoder.

The first thread is used for performing hardware decoding on the first multimedia data. The second thread is used for sequentially outputting the first multimedia data subjected to the decoding processing.

The third thread is used for replicating the first multimedia data to obtain the second multimedia data.

The fourth thread is used for acquiring the running state of the decoder, and acquiring and decoding the second multimedia data in a case that the decoder is in an idle state.

In one implementation, the first multimedia data refers to a cloud gaming video stream. The processing unit 603 is further configured to acquire a scenario requirement of a cloud gaming, the scenario requirement being used for indicating a decoding mode of the cloud gaming video stream. The processing circuitry is configured to acquire the running state of the decoder in the process of performing hardware decoding on the cloud gaming video stream in a case that the scenario requirement indicates that an accelerated decoding mode is used for the cloud gaming video stream.

In an embodiment of this disclosure, a running state of a decoder is acquired in a process of performing hardware decoding on the first multimedia data, the running state including an idle state or a working state. If the running state of the decoder is an idle state, second multimedia data obtained by replicating the first multimedia data is acquired, and the decoder is used to perform decoding processing on the second multimedia data in the idle state. According to this disclosure, in the process of performing hardware decoding on the first multimedia data by the decoder, the cloned first multimedia data is decoded in the idle state of the decoder, so that the decoder maintains a continuous and stable working frequency, thereby stabilizing the performance of the decoder and improving the decoding efficiency thereof.

Figure 7:
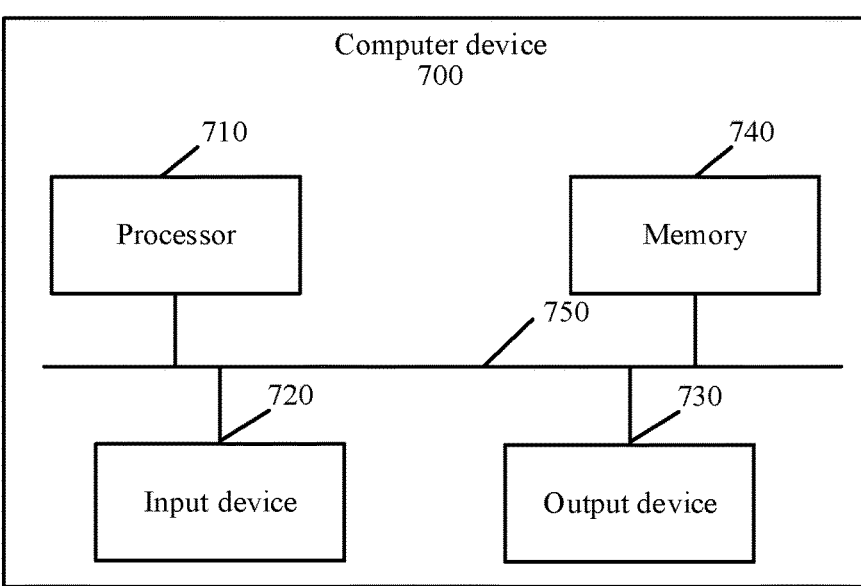
FIG. 7 is a schematic structural diagram of a computer device according to an embodiment of this disclosure.

FIG. 7 is a schematic structural diagram of a computer device according to embodiments of this disclosure. The computer device 700 is configured to perform the steps performed by the computer device in the method embodiments corresponding to FIG. 1 and FIG. 5. The computer device 700 includes: processing circuitry, such as one or more processors 710; and one or more input devices 720, one or more output devices 730, and a memory 740. The processor 710, the input device 720, the output device 730, and the memory 740 are connected through a bus 750. The memory 740 is configured to store a computer program, the computer program including a computer-readable instruction. The processor 710 is configured to call the computer-readable instruction stored in the memory 740 to acquire a running state of a decoder in a process of performing hardware decoding on first multimedia data, the running state including a working state or an idle state. The processor 710 is configured to call the computer-readable instruction stored in the memory 740 to acquire second multimedia data in a case that the decoder is in an idle state, the second multimedia data being obtained by replicating the first multimedia data. The processor 710 is configured to call the computer-readable instruction stored in the memory 740 to use the decoder to perform decoding processing on the second multimedia data in the idle state.

In one implementation, if the running state of the decoder is switched from an idle state to a working state, the processor 710 pauses the decoding processing of the second multimedia data.

In one implementation, the first multimedia data refers to a multimedia data stream. The multimedia data stream includes N data packets, and M media frames are encapsulated in each data packet, N and M being both positive integers. The processor 710 is further configured to replicate an i-th data packet of the multimedia data stream in a case that the decoder receives the i-th data packet to obtain a cloned packet of the i-th data packet, the second multimedia data including the cloned packet of the i-th data packet, i being a positive integer, and i being less than or equal to N. The processing circuitry is configured to perform decoding processing on media frames in the i-th data packet in a case that the decoder is in a working state, and outputting the media frames subjected to the decoding processing in the i-th data packet.

In one implementation, the cloned packet of the i-th data packet includes M cloned frames, and the M cloned frames have one-to-one correspondence to the M media frames in the i-th data packet. The using, by the processor 710, the decoder to perform decoding processing on the second multimedia data in the idle state includes using the decoder to perform decoding processing on the cloned frames in the cloned packet of the i-th data packet in the idle state.

In one implementation, the processor 710 replicates an (i+1)-th data packet of the multimedia data stream in a case that the decoder receives the (i+1)-th data packet to obtain a cloned packet of the (i+1)-th data packet.

The processor 710 deletes the cloned packet of the i-th data packet, so that the second multimedia data includes the cloned packet of the (i+1)-th data packet.

In one implementation, a performance parameter of the decoder is acquired in the process of performing, by the processor 710, hardware decoding on the first multimedia data.

If the performance parameter of the decoder does not meet a performance indicator requirement, the step of acquiring a running state of a decoder is triggered to be performed.

In one implementation, the performance parameter of the decoder includes an actual decoding duration of the first multimedia data, and the performance indicator requirement includes a reference decoding frame rate. The processor 710 is further configured to determine an actual decoding frame rate of the decoder according to the actual decoding duration. The processing circuitry is configured to determine that the performance parameter of the decoder does not meet the performance indicator requirement in a case that the actual decoding frame rate of the decoder is less than the reference decoding frame rate.

In one implementation, the first multimedia data includes a plurality of media frames. The performance parameter of the decoder includes an actual decoding duration of each media frame in the first multimedia data. The performance indicator requirement includes a reference decoding time series range. The processor 710 is further configured to calculate a decoding speed time series of the decoder according to the actual decoding duration of each media frame. The processing circuitry is configured to determine that the performance parameter of the decoder does not meet the performance indicator requirement in a case that the decoding speed time series of the decoder exceeds the reference decoding time series range.

In one implementation, the reference decoding time series range includes reference decoding duration ranges respectively corresponding to the media frames. The processor 710 is further configured to determine, according to an actual decoding duration and a reference decoding duration range corresponding to a same media frame, a target proportion of media frames of which actual decoding durations do not fall within the reference decoding duration ranges. The processing circuitry is configured to determine that the decoding speed time series of the decoder exceeds the reference decoding time series range in a case that the target proportion is greater than or equal to the proportion threshold.

In one implementation, the processor 710 is further configured to perform determine, according to an actual decoding duration of a first media frame in the first multimedia data, the reference decoding duration ranges respectively corresponding to the media frames.

In one implementation, a first thread, a second thread, a third thread, and a fourth thread run in parallel in the decoder.

The first thread is used for performing hardware decoding on the first multimedia data. The second thread is used for sequentially outputting the first multimedia data subjected to the decoding processing.

The third thread is used for replicating the first multimedia data to obtain the second multimedia data.

The fourth thread is used for acquiring the running state of the decoder, and acquiring and decoding the second multimedia data in a case that the decoder is in an idle state.

In one implementation, the first multimedia data refers to a cloud gaming video stream. The processor 710 is further configured to acquire a scenario requirement of a cloud gaming, the scenario requirement being used for indicating a decoding mode of the cloud gaming video stream. The processing circuitry is configured to acquire the running state of the decoder in the process of performing hardware decoding on the cloud gaming video stream in a case that the scenario requirement indicates that an accelerated decoding mode is used for the cloud gaming video stream.

In an embodiment of this disclosure, a running state of a decoder is acquired in a process of performing hardware decoding on the first multimedia data, the running state including an idle state or a working state. If the running state of the decoder is an idle state, second multimedia data obtained by replicating the first multimedia data is acquired, and the decoder is used to perform decoding processing on the second multimedia data in the idle state. According to this disclosure, in the process of performing, by the decoder, hardware decoding on the first multimedia data, the cloned first multimedia data is decoded in the idle state of the decoder, so that the decoder maintains a continuous and stable working frequency, thereby stabilizing the performance of the decoder and improving the decoding efficiency thereof.

It is to be understood that the computer device 700 described in the embodiments of this disclosure may execute the description of the decoding processing method in the embodiments corresponding to FIG. 1 and FIG. 5, and may also execute the description of the decoding processing apparatus 600 in the embodiments corresponding to FIG. 6, which will not be repeated here.

In addition, the embodiments of this disclosure further provide a computer storage medium, such as a non-transitory computer-readable storage medium. A computer program is stored in the computer storage medium. The computer program includes a computer-readable instruction. A processor, when executing the program instruction, may perform the method in the embodiments corresponding to of FIG. 1 and FIG. 5. Therefore, the details will not be repeated here again. For examples of the technical details which are not disclosed in the embodiment of the computer storage medium involved in this disclosure, reference may be made to the description of the method embodiment of this disclosure. As an example, the program instruction is executed on a single computer device, or on a plurality of computer devices in a location, or on a plurality of computer devices distributed in a plurality of locations and interconnected through a communication network.

According to one aspect of this disclosure, a computer program product or a computer program is provided. The computer program product or the computer program includes a computer-readable instruction. The computer-readable instruction is stored in a computer-readable storage medium. A processor of a computer device reads the computer-readable instruction from the computer-readable storage medium, and the processor executes the computer-readable instruction, so that the computer device may perform the method in the embodiments corresponding to FIG. 1 and FIG. 5. Therefore, the details will not be repeated here.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

A person of ordinary skill in the art may understand that all or some of procedures of the method in the foregoing embodiments may be implemented by the computer-readable instruction instructing relevant hardware. The program may be stored in a computer-readable storage medium. When the program is executed, the procedures of the foregoing method embodiments may be implemented. The foregoing storage medium may be a floppy disk, an optical disc, a read-only memory (ROM), or a random-access memory (RAM), etc.

What is disclosed above is merely exemplary embodiments of this disclosure, and certainly is not intended to limit the scope of the claims of this disclosure. Therefore, equivalent variations shall fall within the scope of this disclosure.

What is claimed is:

1. A method for decoding, the method comprising:

acquiring, via a fourth thread in a decoder, a running state of the decoder that is performing hardware decoding on a plurality of first content data, a first thread in the decoder being configured to perform the hardware decoding on the plurality of first content data, the first thread and the fourth thread being configured to run in parallel in the decoder; and when the running state of the decoder is determined to be in an idle state between the decoding of the plurality of first content data, acquiring second content data, the second content data being a copy of one of the plurality of first content data, and performing, by processing circuitry of the decoder, decoding on the second content data.

2. The method according to claim 1, further comprising:

pausing the decoding of the second content data when the running state of the decoder switches from the idle state to a working state.

3. The method according to claim 1, wherein the plurality of first content data includes a multimedia data stream, the multimedia data stream including N data packets, M media frames are encapsulated in each of the N data packets, and N and M are both positive integers, and the method further comprises:

copying an i-th data packet of the multimedia data stream when the decoder receives the i-th data packet to obtain a cloned packet of the i-th data packet, the second content data including the cloned packet of the i-th data packet, i being a positive integer, and i being less than or equal to N;

performing decoding on media frames in the i-th data packet when the decoder is in a working state; and outputting the media frames subjected to the decoding in the i-th data packet.

4. The method according to claim 3, wherein the cloned packet of the i-th data packet includes M cloned frames, and the M cloned frames have a one-to-one correspondence to the M media frames in the i-th data packet; and the performing the decoding on the second content data in the idle state includes performing, by the decoder, the decoding on the M cloned frames in the cloned packet of the i-th data packet in the idle state.

5. The method according to claim 3, further comprising:

copying an (i+1)-th data packet of the multimedia data stream when the decoder receives the (i+1)-th data packet to obtain a cloned packet of the (i+1)-th data packet; and deleting the cloned packet of the i-th data packet.

6. The method according to claim 1, further comprising:

acquiring a performance parameter of the decoder that is performing the hardware decoding on the plurality of first content data; and acquiring the running state of the decoder when the performance parameter of the decoder does not meet a performance indicator requirement.

7. The method according to claim 6, wherein the performance parameter of the decoder includes an actual decoding duration of one of the plurality of first content data, and the performance indicator requirement includes a reference decoding frame rate; and the method further comprises:

determining an actual decoding frame rate of the decoder according to the actual decoding duration; and determining that the performance parameter of the decoder does not meet the performance indicator requirement when the actual decoding frame rate of the decoder is less than the reference decoding frame rate.

8. The method according to claim 6, wherein the first plurality of first content data includes a plurality of media frames, the performance parameter of the decoder includes an actual decoding duration of each media frame in the plurality of first content data, the performance indicator requirement includes a reference decoding time series range, and the method further comprises:

calculating a decoding speed time series of the decoder according to the actual decoding duration of each media frame; and determining that the performance parameter of the decoder does not meet the performance indicator requirement when the decoding speed time series of the decoder exceeds the reference decoding time series range.

9. The method according to claim 8, wherein the reference decoding time series range includes reference decoding duration ranges respectively corresponding to the plurality of media frames, and the method further comprises:

determining, according to an actual decoding duration and a reference decoding duration range corresponding to a same media frame of the media frame, a target proportion of media frames of which the actual decoding durations do not fall within the reference decoding duration ranges; and determining that the decoding speed time series of the decoder exceeds the reference decoding time series range when the target proportion is greater than or equal to a proportion threshold.

10. The method according to claim 9, further comprising:

determining, according to the actual decoding duration of a first media frame in the plurality of first content data, the reference decoding duration ranges respectively corresponding to the plurality of media frames.

11. The method according to claim 1, wherein the first thread, a second thread, a third thread, and the fourth thread are configured to run in parallel in the decoder;

the first thread is configured to perform the hardware decoding on the plurality of first content data;

the second thread is configured to sequentially output the plurality of first content data subjected to the decoding processing;

the third thread is configured to copy the plurality of first content data to obtain the second content data; and the fourth thread is configured to acquire the running state of the decoder, and acquire and decode the second content data when the decoder is in the idle state.

12. The method according to claim 1, wherein the plurality of first content data includes a cloud gaming video stream, and the method further comprises:

acquiring a scenario requirement that indicates a decoding mode of the cloud gaming video stream; and acquiring the running state of the decoder that is performing the hardware decoding on the cloud gaming video stream when the scenario requirement indicates that an accelerated decoding mode is required for the cloud gaming video stream.

13. A decoding apparatus, comprising:

processing circuitry configured to:

acquire, via a fourth thread in a decoder, a running state of the decoder that is performing hardware decoding on a plurality of first content data, a first thread in the decoder being configured to perform the hardware decoding on the plurality of first content data, the first thread and the fourth thread being configured to run in parallel in the decoder; and when the running state of the decoder is determined to be in an idle state between the decoding of the plurality of first content data, acquire second content data, the second content data being a copy of one of the plurality of first content data, and perform decoding on the second content data.

14. The decoding apparatus according to claim 13, wherein the processing circuitry is configured to:

pause the decoding of the second content data when the running state of the decoder switches from the idle state to a working state.

15. The decoding apparatus according to claim 13, wherein the plurality of first content data includes a multimedia data stream, the multimedia data stream including N data packets, M media frames are encapsulated in each of the N data packets, and N and M are both positive integers, and the processing circuitry is configured to:

copy an i-th data packet of the multimedia data stream when the decoder receives the i-th data packet to obtain a cloned packet of the i-th data packet, the second content data including the cloned packet of the i-th data packet, i being a positive integer, and i being less than or equal to N;

perform decoding on media frames in the i-th data packet when the decoder is in a working state; and output the media frames subjected to the decoding in the i-th data packet.

16. The decoding apparatus according to claim 15, wherein the cloned packet of the i-th data packet includes M cloned frames, and the M cloned frames have a one-to-one correspondence to the M media frames in the i-th data packet; and the processing circuitry is configured to perform the decoding on the M cloned frames in the cloned packet of the i-th data packet in the idle state.

17. The decoding apparatus according to claim 15, wherein the processing circuitry is configured to:

copy an (i+1)-th data packet of the multimedia data stream when the decoder receives the (i+1)-th data packet to obtain a cloned packet of the (i+1)-th data packet; and delete the cloned packet of the i-th data packet.

18. The decoding apparatus according to claim 13, wherein the processing circuitry is configured to:

acquire a performance parameter of the decoder that is performing the hardware decoding on the plurality of first content data; and acquire the running state of the decoder when the performance parameter of the decoder does not meet a performance indicator requirement.

19. The decoding apparatus according to claim 18, wherein the performance parameter of the decoder includes an actual decoding duration of one of the plurality of first content data, and the performance indicator requirement includes a reference decoding frame rate; and the processing circuitry is configured to:

determine an actual decoding frame rate of the decoder according to the actual decoding duration; and determine that the performance parameter of the decoder does not meet the performance indicator requirement when the actual decoding frame rate of the decoder is less than the reference decoding frame rate.

20. A non-transitory computer-readable storage medium, storing instructions which when executed by a processor cause the processor to perform:

acquiring, via a fourth thread in a decoder, a running state of the decoder that is performing hardware decoding on a plurality of first content data, a first thread in the decoder being configured to perform the hardware decoding on the plurality of first content data, the first thread and the fourth thread being configured to run in parallel in the decoder; and when the running state of the decoder is determined to be in an idle state between the decoding of the plurality of first content data, acquiring second content data, the second content data being a copy of one of the plurality of first content data, and performing decoding on the second content data.

* * * * *